United States Patent
Basavaraj et al.

(10) Patent No.: US 9,826,472 B2
(45) Date of Patent: Nov. 21, 2017

(54) APPARATUS AND METHOD OF SELECTING PLMN IN MOBILE COMMUNICATION SYSTEM

(71) Applicant: Samsung Electronics Co., Ltd., Suwon-si, Gyeonggi-do (KR)

(72) Inventors: Dandra Prasad Basavaraj, Suwon-si (KR); Pavan Kumar Devarayanigari, Bangalore (IN); Srinivas Chinthalapudi, Visakhapatnam (IN); Vijay Ganesh Surisetty, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/719,696

(22) Filed: May 22, 2015

(65) Prior Publication Data

US 2015/0351023 A1     Dec. 3, 2015

(30) Foreign Application Priority Data

May 28, 2014   (KR) ......................... 10-2014-0064282

(51) Int. Cl.
*H04W 48/18*     (2009.01)
*H04W 4/22*      (2009.01)

(52) U.S. Cl.
CPC ............. *H04W 48/18* (2013.01); *H04W 4/22* (2013.01)

(58) Field of Classification Search
CPC ........ H04W 48/08; H04W 48/18; H04W 4/22
USPC ............................................. 455/404.1, 434
See application file for complete search history.

(56) References Cited

U.S. PATENT DOCUMENTS

| | | | |
|---|---|---|---|
| 9,125,146 B1 * | 9/2015 | Edara ................ | H04W 48/18 |
| 2005/0075129 A1 * | 4/2005 | Kuchibhotla ........ | H04W 48/18 455/552.1 |
| 2005/0227720 A1 * | 10/2005 | Gunaratnam ........ | H04W 48/18 455/510 |
| 2009/0298459 A1 * | 12/2009 | Saini .................. | H04W 76/007 455/404.1 |
| 2012/0028637 A1 | 2/2012 | Kashikar et al. | |
| 2012/0190361 A1 | 7/2012 | Shaikh et al. | |
| 2014/0153408 A1 * | 6/2014 | Jun ..................... | H04L 65/1066 370/250 |
| 2015/0245258 A1 * | 8/2015 | Kim ..................... | H04W 48/18 370/331 |

FOREIGN PATENT DOCUMENTS

WO       2007-086679 A1    8/2007

* cited by examiner

*Primary Examiner* — Michael Neff
(74) *Attorney, Agent, or Firm* — Jefferson IP Law, LLP

(57) ABSTRACT

An apparatus and a method of selecting Public Land Mobile Networks (PLMNs) in a manual PLMN selection mode are provided. The method includes selecting a PLMN as a network that the terminal will be attached to in a manual PLMN selection mode, storing the selected PLMN in a user selection PLMN list, and selecting, when the terminal attempts recovery to receive normal services in a limited service state, a PLMN to be attached to a network based on at least one PLMN included in the stored user selection PLMN list.

20 Claims, 13 Drawing Sheets

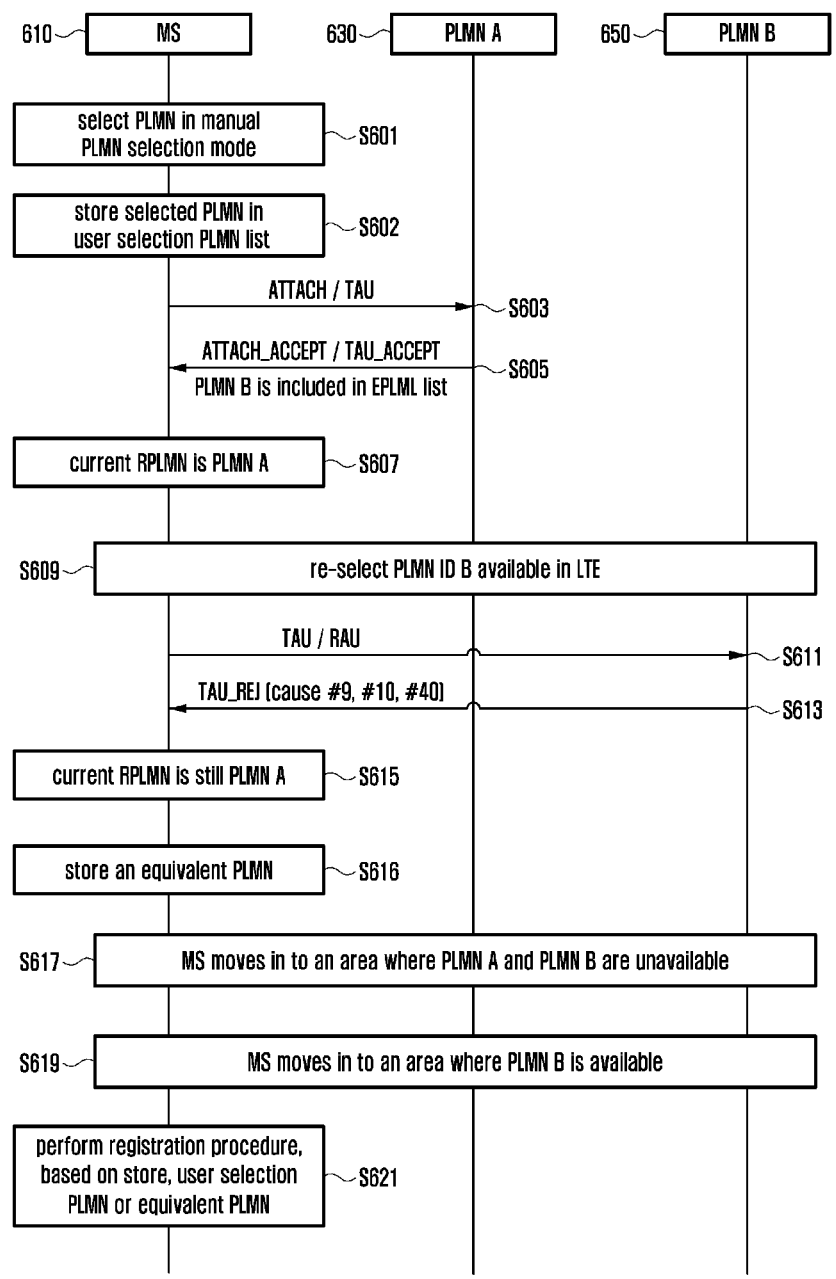

APPARATUS AND METHOD OF SELECTING PLMN IN MOBILE COMMUNICATION SYSTEM

CROSS-REFERENCE TO RELATED APPLICATION(S)

This application claims the benefit under 35 U.S.C. §119 (a) of a Korean patent application filed on May 28, 2014 in the Korean Intellectual Property Office and assigned Serial number 10-2014-0064282, the entire disclosure of which is hereby incorporated by reference.

TECHNICAL FIELD

The present disclosure relates to an apparatus and method of selecting a Public Land Mobile Network (PLMN) in a mobile communication system. More particularly, the present disclosure relates to an apparatus and method of selecting a PLMN in a manual PLMN selection mode of mobile station (MS).

BACKGROUND

In general, mobile station (MS) performs a process of selecting a Public Land Mobile Network (PLMN) in order to receive mobile communication services. When MS is turned on, it searches for surrounding PLMNs, selects one of the PLMNs which has the highest priority of order and performs the location registration.

When users register a mobile communication service provider's Identifier (ID) to use roaming services abroad, their MSs may be connected to User PLMN of the service provider. When customers open their accounts with a communication service provider or request an internal roaming service, the service provider creates Foreign PLMN (FPLMN) and provides it to them. When specific codes were not set to MS, the Mobile Entity (ME) may connect to automatically searched provider's networks.

According to the Specification 23.122, when a user manually selects a PLMN, the MS enters a manual PLMN selection mode. While a MS is in a manual PLMN selection mode, the MS is not allowed to register to a different PLMN by itself. Specification, 23.122 section 4.4.3.1.2., is described as follows.

Once an MS has registered on a PLMN selected by the user (manual mode), the MS shall not automatically register on a different PLMN, unless:

i) a new PLMN is declared as an equivalent PLMN by the registered PLMN (RPLMN); or ii) the user selects automatic mode.

Once a PLMN is selected in a manual PLMN selection mode, the MS does not register on a new PLMN except for the cases described above. Therefore, new systems are required to resolve the problems.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method of selecting a Public Land Mobile Network (PLMN) in a mobile communication system.

Another aspect of the present disclosure is to provide an apparatus and method of selecting a PLMN in a manual PLMN selection mode.

Another aspect of the present disclosure is to provide an apparatus and method of providing a PLMN selection in a case where a PLMN cannot normally register since a registered PLMN (RPLMN) or the equivalent PLMN has been deleted.

In accordance with an aspect of the present disclosure, a method of selecting PLMNs by a terminal in a mobile communication system is provided. The method includes selecting a PLMN as a network that the terminal will be attached to in a manual PLMN selection mode, storing the selected PLMN in a user selection PLMN list, and selecting, when the terminal attempts recovery to receive normal services in a limited service state, a PLMN to be attached to a network, based on the stored, selected PLMN list of PLMNs.

In accordance with another aspect of the present disclosure, a terminal of selecting PLMNs in a mobile communication system is provided. The terminal includes a transceiver for communicating with at least one network node, and a PLMN controller. The PLMN controller: selects a PLMN as a network that the terminal will be attached to in a manual PLMN selection mode, stores the selected PLMN in a user selection PLMN list, and selects, when attempting recovery to receive normal services in a limited service state, a PLMN to be attached to a network, based on the stored, selected PLMN list of PLMNs.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a diagram that describes a PLMN selection according to a third embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the various embodiments of the present disclosure, 'communication' is explained a process between mobile station (MS) and Public Land Mobile Network (PLMN) or MS and network. The entities of PLMN and network transmitting signals to/from MS may be base stations or upper nodes.

As an MS has recently supported many Radio Access Technologies (RATs), the complexity for processing RATs also increases. There are scenarios with which a network supports various types of RATs. In the following embodiment of the present disclosure, for various abnormal scenarios, the apparatus and method provides general services to users who manage multiple RATs for supporting MSs in a manual PLMN selection mode. In the 3rd Generation Partnership Project (3GPP) standard, when MS lost a chance to maintain general services, the MS does not provide a scenario for normally selecting a PLMN in a manual PLMN selection mode. Therefore, various embodiments of the present disclosure provide an apparatus and method of normally selecting a PLMN in a manual PLMN selection mode.

Figure 1:
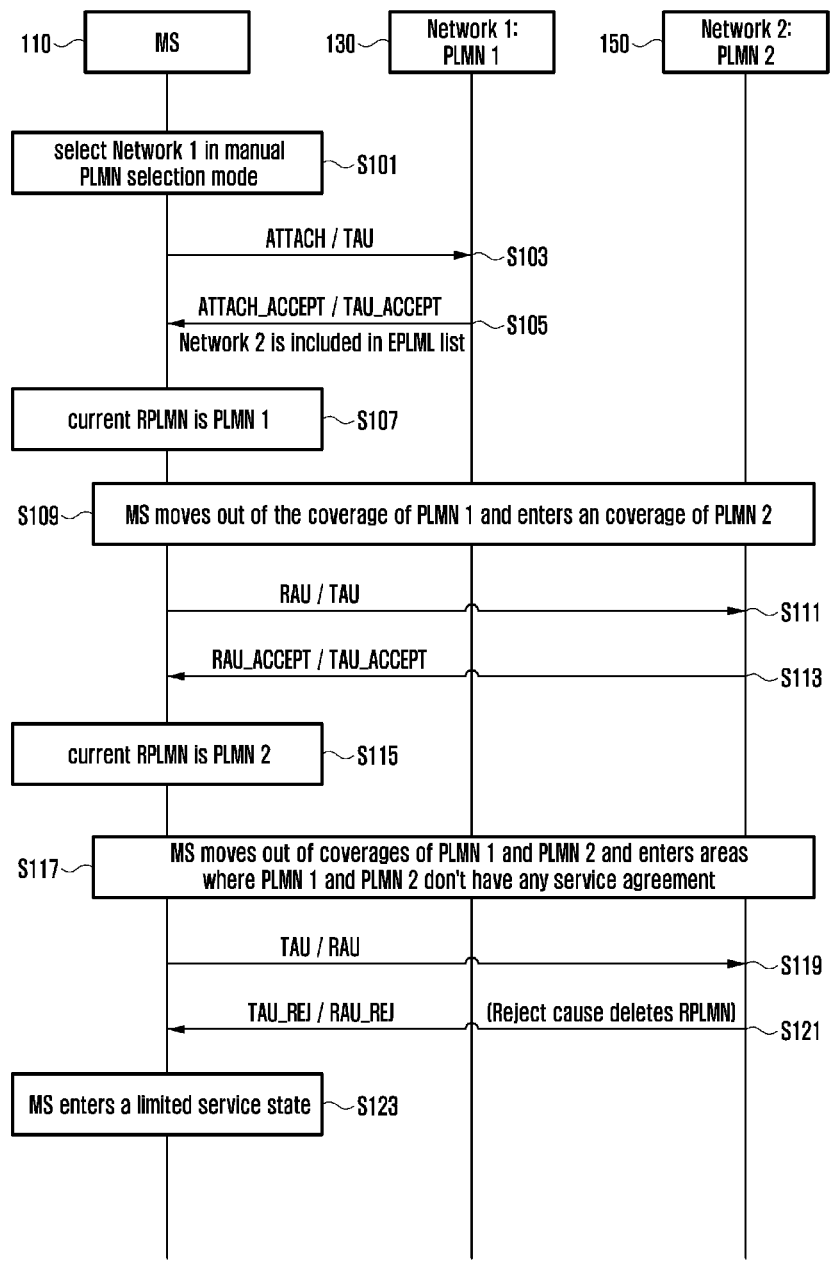
FIG. 1 is a diagram that describes a case where services of a mobile station (MS) are limited since a registered Public Land Mobile Network (RPLMN) has been deleted according to an embodiment of the present disclosure.

FIG. 1 is a diagram that describes a case where services of an MS are limited since a registered PLMN (RPLMN) has been deleted according to an embodiment of the present disclosure.

Referring to FIG. 1, the mobile communication system may include: MS 110; Network 1, reference number 130, connected to PLMN 1; and Network 2, reference number 150, connected to PLMN 2. When the MS is in a manual PLMN selection mode, it may select a network according to a user's request in operation S101. In the embodiment of FIG. 1, it is assumed that the MS has selected Network 1 according to a user's command. In the following description, the term 'network selection' may be also used in the sense of 'PLMN selection.' For example, 'selecting Network 1' is identical to 'selecting PLMN 1' and 'selecting Network 2' is identical to 'selecting PLMN 2.' In explaining transmission of signals between the MS and a network or between the MS and a PLMN, the network or PLMN may be a base station and an upper node (or a core network node, e.g., Mobility Management Entity (MME)) managed by corresponding network or PLMN. Signal switching between upper node and the MS may be performed by a base station. The base station may directly transmit/receive signals to/from the MS. Selecting a specific PLMN may be used in the sense of selecting a PLMN Identifier (ID) corresponding to the specific PLMN by the MS.

The MS 110 may transmit an Attach Request message (ATTACH) or Tracking Area Update (TAU) Request message (TAU) to the Network 1 according to the current state of the MS 110 in operation S103. Network 1 may transmit, to the MS 110, an acceptance message, ATTACH_ACCEPT or TAU_ACCEPT, in response to the request message from the MS 110 in operation S105. Since Network 1 can support services for the MS 110, it transmits the attachment acceptance message to the MS 110. The ATTACH_ACCEPT or TAU_ACCEPT message may include an equivalent PLMN (EPLMN) list. In the embodiment, the Network 1 may inform the MS that an EPLMN of the PLMN 1 is PLMN 2, through the ATTACH_ACCEPT or TAU_ACCEPT message. A current RPLMN of the MS 110 is Network 1 (or PLMN 1) in operation S107.

The MS 110 may move out of the coverage of PLMN 1 and enter a coverage of PLMN 2, reference number 150 in operation S109. The MS 110 may transmit a Tracking Area Update Request message (TAU) or Routing Area Update (RAU) Request message (RAU) to the Network 2 according to the current state of the MS 110 in operation S111. Network 2 may transmit, to the MS 110, an acceptance message, TAU_ACCEPT or RAU_ACCEPT, in response to the request message from the MS 110 in operation S113. Since Network 2 as an EPLMN of the PLMN 1 can support services for the MS 110, it transmits the attachment acceptance message to the MS 110. The TAU_ACCEPT or RAU_ACCEPT message may include an EPLMN list, EPLMN LIST. In the embodiment, the Network 2 may inform the MS 110 that an EPLMN of the PLMN 2 is PLMN 1, through the TAU_ACCEPT or RAU_ACCEPT message. A current RPLMN of the MS 110 is Network 2 (or PLMN 2) in operation S115.

The MS 110 may move out of coverages of PLMN 1 and PLMN 2 and enter areas where PLMN 1 and PLMN 2 don't have any service agreement in operation S117. The MS 110 may transmit a TAU Request message or RAURequest message to the Network 2 according to the current state of the MS 110 in operation S119. Network 2 may transmit, to the MS 110, a rejection message, TAU_REJ or RAU_REJ, in response to the request message from the MS 110 in operation S121. Since the MS 110 is now out of the coverages of PLMN 1 and PLMN 2, PLMN 2 cannot support services for the MS 110 and thus transmits the attachment rejection message to the MS 110.

The attachment rejection message TAU_REJ or RAU_REJ may cause a deletion of a RPLMN or an EPLMN. The following table 1 is an excerpt from specification TS 23.122 section 5 to show outputs for registration and different reject cause value for which RPLMN is not considered valid.

TABLE 1

Effect of LR Outcomes on PLMN Registration

| Location Registration Task State | Registration Status | RPLMN is |
|---|---|---|
| Updated | Successful | Indicated in the stored registration area identity |
| Idle, No IMSI | Unsuccessful | No RPLMN (3) (4) |
| Roaming not allowed: | | |
| a) PLMN not allowed | Unsuccessful | No RPLMN (4) |
| b) LA not allowed or TA not allowed | Indeterminate(1) | No RPLMN |
| c) Roaming not allowed in this LA or Roaming not allowed in this TA | Indeterminate (2) | No RPLMN (4) |
| d) No suitable cells in location area or No suitable cells in tracking area | Indeterminate (5) | No RPLMN |
| e) Not authorized for this CSG | Indeterminate (6) | No rRPLMN |
| Not updated | Unsuccessful | No RPLMN (4) |

In the situation describe in Table 1, RPLMN is cleared off. When a RPLMN is deleted in a manual PLMN selection mode, the MS enters an indefinite limited service state unless the manual PLMN selection mode is returned to an automatic PLMN selection mode. Therefore, in the embodiment of FIG. 1, since a RPLMN has been deleted, the MS enters a limited service state in operation S123. In that case, when the MS receives a command for deleting a RPLMN, it needs a method of registering a PLMN to use not only a limited service but also a normal service.

Figure 2:
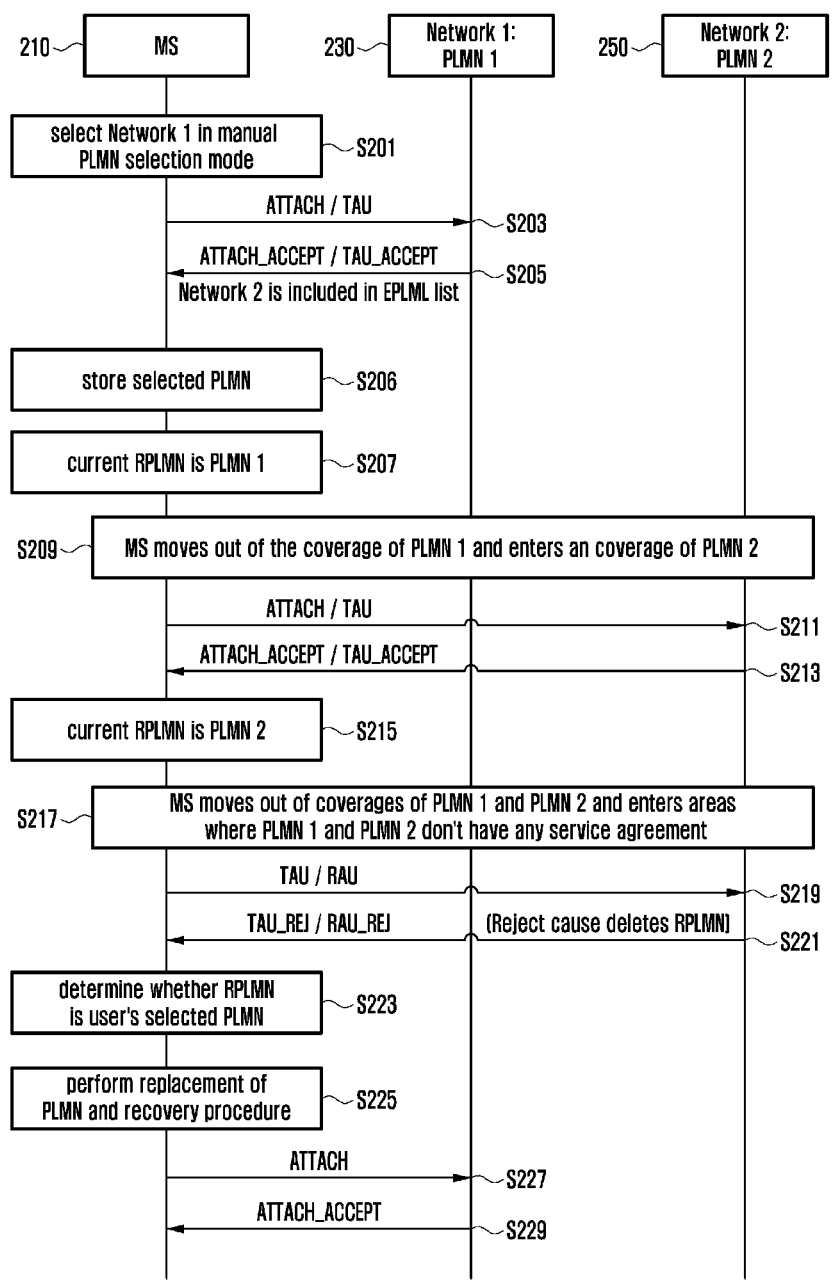
FIG. 2 is a diagram that describes a PLMN selection according to a first embodiment of the present disclosure.

FIG. 2 is a diagram that describes a PLMN selection according to a first embodiment of the present disclosure.

Referring to FIG. 2, the mobile communication system may include: MS 210; Network 1, reference number 230, connected to PLMN 1; and Network 2, reference number 250, connected to PLMN 2. When the MS is in a manual PLMN selection mode, it may select a network according to a user's request in operation S201. In the embodiment of FIG. 2, it is assumed that the MS has selected Network 1 according to a user's command. The MS 210 may transmit an Attach Request message (ATTACH) or TAU Request message (TAU) to the Network 1 according to the current state of the MS 210 in operation S203. Network 1 may transmit, to the MS 210, an acceptance message, ATTACH_ACCEPT or TAU_ACCEPT, in response to the request message from the MS 210 in operation S205. The ATTACH_ACCEPT or TAU_ACCEPT message may include an EPLMN list, EPLMN LIST. In the embodiment of FIG. 2, the Network 1 may inform the MS 210 that an EPLMN of the PLMN 1 is PLMN 2, through the ATTACH_ACCEPT or TAU_ACCEPT message.

After receiving the attachment acceptance message, the MS 210 may store a user's selected PLMN in operation S206. The MS 210 may be set in such a way as to store a user's selected PLMN after receiving an attachment acceptance message. The attachment acceptance message refers to a successful registration of PLMN. The storage of PLMN is performed when the MS runs on in a manual mode. The MS 210 may store a PLMN that the user has selected only in a manual PLMN selection mode. An additionally stored user selection PLMN list is not deleted in the process of altering PLMN. In the embodiment of FIG. 2, since the MS 210 stores PLMN in operation S206, it may provide a normal service using the stored PLMN although it receives a RPLMN deleting command.

A current RPLMN of the MS 210 is Network 1 (or PLMN 1) in operation S207. The MS 210 may move out of the coverage of PLMN 1 and enter a coverage of PLMN 2, reference number 250 in operation S209. The MS 210 may transmit a TAU Request message (TAU) or RAU Request message (RAU) to the Network 2 according to the current state of the MS 210 in operation S211. Network 2 may transmit, to the MS 210, an acceptance message, TAU_ACCEPT or RAU_ACCEPT, in response to the request message from the MS 210 in operation S213. The TAU_ACCEPT or RAU_ACCEPT message may include an EPLMN list, EPLMN LIST. In the embodiment of FIG. 2, the Network 2 may inform the MS 210 that an EPLMN of the PLMN 2 is PLMN 1, through the TAU_ACCEPT or RAU_ACCEPT message. A current RPLMN of the MS 210 is Network 2 (or PLMN 2) in operation S215.

The MS 210 may move out of coverages of PLMN 1 and PLMN 2 and enter areas where PLMN 1 and PLMN 2 don't have any service agreement in operation S217. The MS 210 may transmit a TAU (TAU) Request message or RAU Request message to the Network 2 according to the current state of the MS 210 in operation S219. Network 2 may transmit, to the MS 210, a rejection message, TAU_REJ or RAU_REJ, in response to the request message from the MS 210 in operation S221. Since the MS 210 is now out of the coverages of PLMN 1 and PLMN 2, PLMN 2 cannot support services for the MS 210 and thus transmits the attachment rejection message to the MS 210. The attachment rejection message TAU_REJ or RAU_REJ may cause a deletion of a RPLMN.

The MS 210 may determine whether the RPLMN, RPLMN, (i.e., PLMN 2 at the current operation of FIG. 2) is identical to a user's selected PLMN (i.e., PLMN 1 selected in operation S201) in operation S223. Since the currently RPLMN is PLMN 2 and a user's selected PLMN is PLMN 1 in the embodiment of FIG. 2, the RPLMN differs from the user selection PLMN selected in a manual PLMN selection mode. In that case, the MS 210 proceeds with operation S225.

The MS 210 may perform a change process for PLMN in operation S225. The MS 210 may change a RPLMN to a user selection PLMN that was stored. That is, the MS 210 may change a RPLMN from PLMN 2 to PLMN 1. The MS 210 may a network restoring procedure based on the changed PLMN.

The MS 110 may transmit an Attach Request message (ATTACH) to the Network 1 in operation S227. Network 1 may transmit, to the MS 210, an acceptance message ATTACH_ACCEPT in response to the request message from the MS 210 in operation S229. After that, the MS 210 may use normal services.

In the embodiment of FIG. 1, when the MS 110 moves out of the coverages of PLMN 1 and PLMN 2, the RPLMN is deleted. Since the PLMN list does not exist, the MS 110 cannot connect to Network 1 in the coverage of PLMN 1. Therefore, the MS 110 can use only limited services. In the embodiment of FIG. 2, when a PLMN is selected according to a user's request in a manual mode, the MS 210 can store the selected PLMN. After that, when a RPLMN differs from the selected PLMN, the MS 210 can make a restoration to the user selection PLMN, based on the stored PLMN list, and thus can use services normally. Unless the MS is not rejected by a network, it maintains a process of searching for a user selection PLMN, thereby resolving a problem that it is impossible to register a PLMN since a RPLMN has been deleted.

Figure 3A:
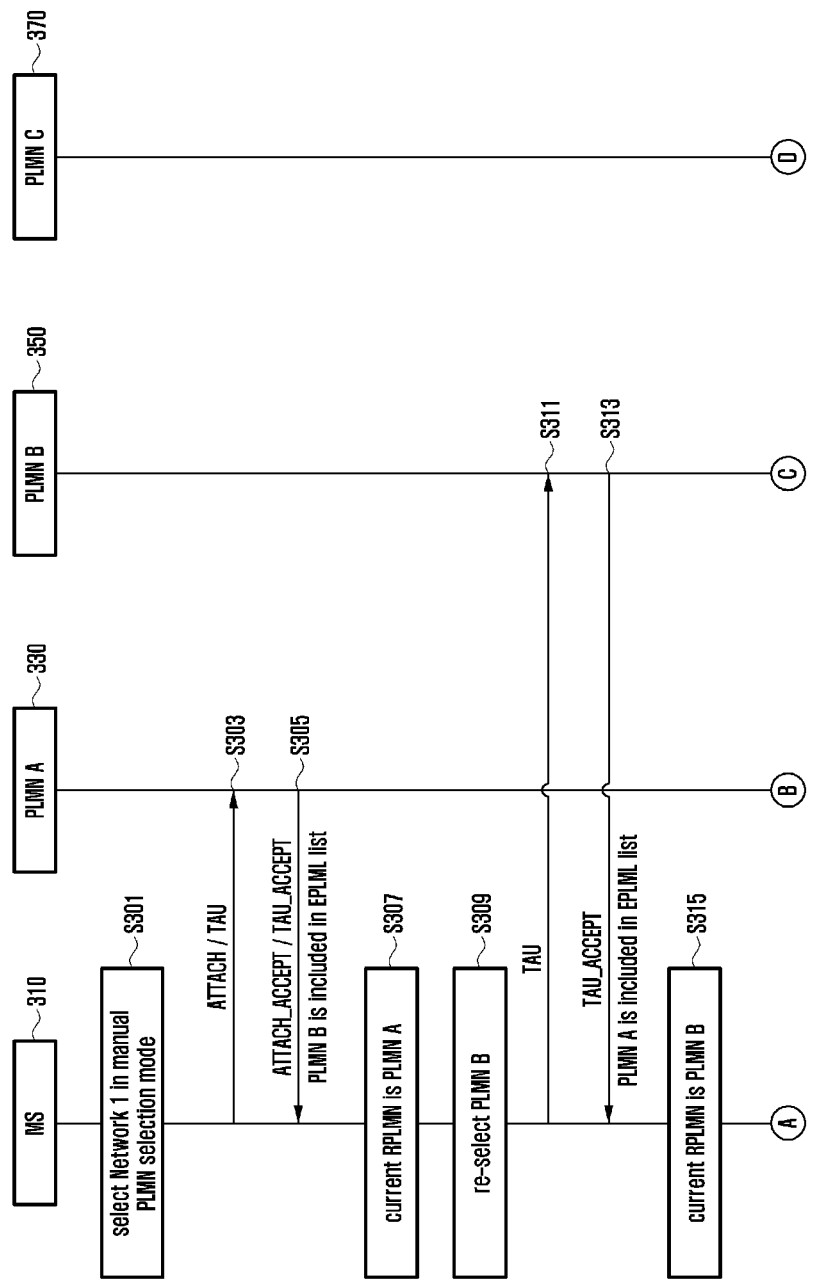
FIGS. 3A and 3B are diagrams that describe a process of an MS when an equivalent PLMN list is deleted according to various embodiments of the present disclosure.
Figure 3B:
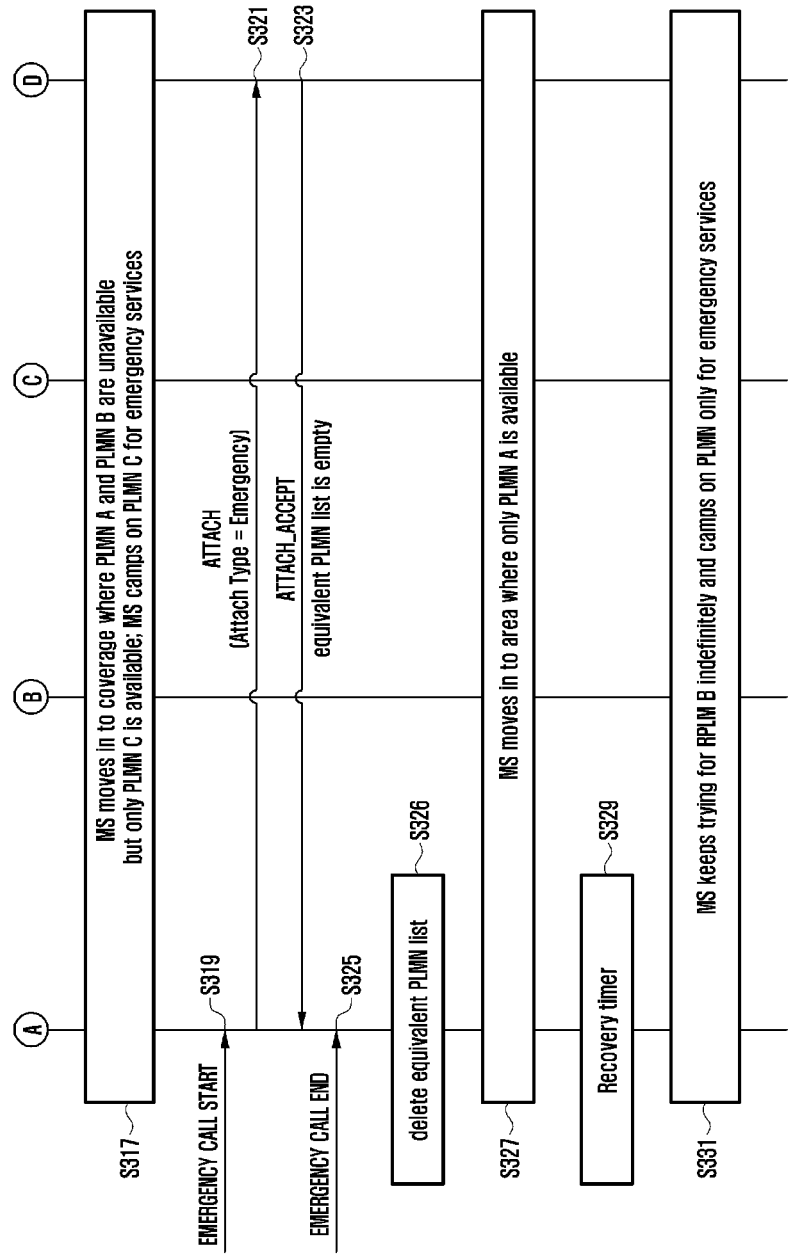

FIGS. 3A and 3B are diagrams that describe a process of an MS when an EPLMN list is deleted according to various embodiments of the present disclosure.

Referring to FIGS. 3A and 3B, the mobile communication system may include: MS 310; PLMN A, reference number 330; PLMN B, reference number 350; and PLMN C, reference number 370. When the MS 310 is in a manual PLMN selection mode, it may select a PLMN according to a user's request in operation S301. In the embodiments of FIGS. 3A and 3B, it is assumed that the MS 310 has selected PLMN A according to a user's command.

The MS 310 may transmit an Attach Request message (ATTACH) or TAU Request message (TAU) to the PLMN A according to the current state of the MS 310 in operation S303. The PLMN A may transmit, to the MS 310, an acceptance message, ATTACH_ACCEPT or TAU_ACCEPT, in response to the request message from the MS 310 in operation S305. The ATTACH_ACCEPT or TAU_ACCEPT message may include an EPLMN list, EPLMN LIST. In the embodiments of FIGS. 3A and 3B, the PLMN A may inform the MS 310 that an EPLMN of the PLMN A is PLMN B, through the ATTACH_ACCEPT or TAU_ACCEPT message. A current RPLMN of the MS 310 is PLMN A in operation S307.

While the MS 310 is receiving services from the PLMN A, it may select a new PLMN and receive services from the new PLMN. The MS 310 may select a new PLMN in operation S309. In the embodiment of FIG. 3, the MS 310 may select PLMN B as a new PLMN in operation S309. The MS 310 may transmit a TAU Request message (TAU) to the PLMN B in operation S311. The PLMN B may transmit, to the MS 310, an acceptance message, TAU_ACCEPT, in response to the request message from the MS 310 in operation S313. The TAU_ACCEPT message may include an EPLMN list, EPLMN LIST. In the embodiments of FIGS. 3A and 3B, the PLMN B may inform the MS 310 that an EPLMN of the PLMN B is PLMN A, through the TAU_ACCEPT message. A current RPLMN of the MS 310 is PLMN B in operation S315. Therefore, PLMN A is deleted from the registration PLMN list. However, the PLMN A may be stored on an EPLMN list of PLMN B.

The MS 310 may move in to an area where PLMN A and PLMN B are unavailable but only PLMN C is available in operation S317. It is assumed that the MS 310 can use only emergency services from PLMN C. That is, the MS 310 can camp on PLMN C for emergency services.

The MS 310 starts with an emergency call in operation S319. The MS 310 may transmit an Attach Request message (ATTACH) for attachment to the PLMN C in operation S321. The type of attachment, Attach Type, may be Emergency. The PLMN C may transmit, to the MS 310, an acceptance message, ATTACH_ACCEPT, in response to the attachment request message from the MS 310 in operation S323. The message indicates that an EPLMN list, EPLMN LIST, is empty. The MS 310 ends the emergency call in operation S325.

The MS 310 may delete the EPLMN list in operation S326. When attachment for emergency services is accepted by the MS 310, the EPLMN list is replaced with a new list or deleted. The operation is explained in the Specification TS 23.301 section 5.5.1.2.4 (ATTACH ACCEPTED BY THE NETWORK) as follows: "The MME may also include a list of EPLMNs in the ATTACH ACCEPT message. Each entry in the list contains a PLMN code (MCC+MNC). The UE shall store the list as provided by the network, and if the attach procedure is not for emergency bearer services, the UE shall remove from the list any PLMN code that is already in the list of "forbidden PLMNs" or in the list of "forbidden PLMNs for GPRS service." In addition, the UE shall add to the stored list the PLMN code of the RPLMN that sent the list. The UE shall replace the stored list on each receipt of the ATTACH ACCEPT message. If the ATTACH ACCEPT message does not contain a list, then the UE shall delete the stored list."

The MS 310 moves in to area where only PLMN A is available in operation S327. A recovery timer may start in operation S329. The MS 310 may start with a recovery procedure to receive network services. It is preferable that the MS 310 attempts registration on PLMN A.

Since PLMN A has been deleted in operation S325 (or an EPLMN has been deleted and the current RPLMN is PLMN B), although the MS 310 is in an area where PLMN A is available, it cannot attempt registration on PLMN A in operation S331. Although the MS 310 keeps searching for PLM B indefinitely and attempting to register PLMN B, it cannot register in the PLMN B. This is because the MS 310 is in coverage where PLMN B is unavailable. Since PLMN A is not on the PLMN list, the MS 310 camps on PLMN A only for emergency services. Therefore, when the MS camps on PLMN for emergency services in a manual PLMN selection mode, it cannot attempt registration on PLMN in an area where an EPLMN is available.

Figure 4A:
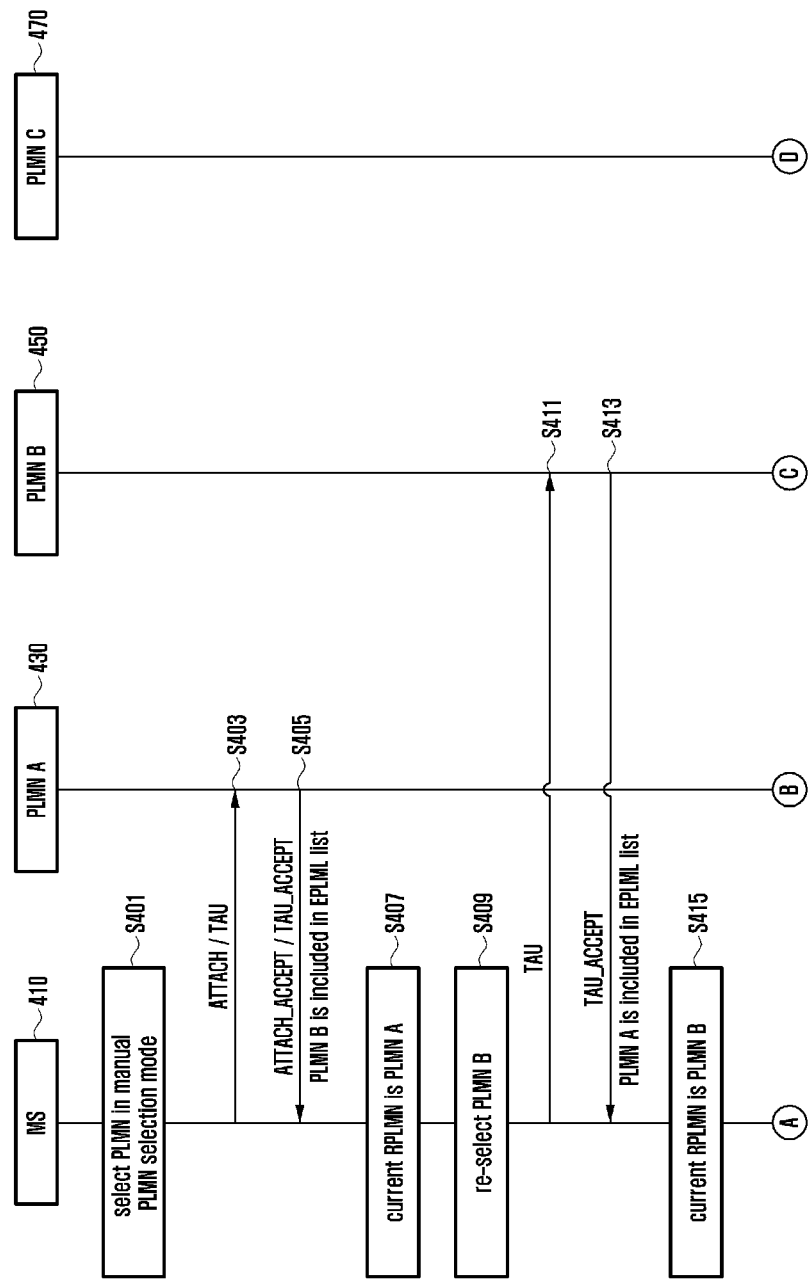
FIGS. 4A and 4B are diagrams that describe a PLMN selection according to a second embodiment of the present disclosure.
Figure 4B:
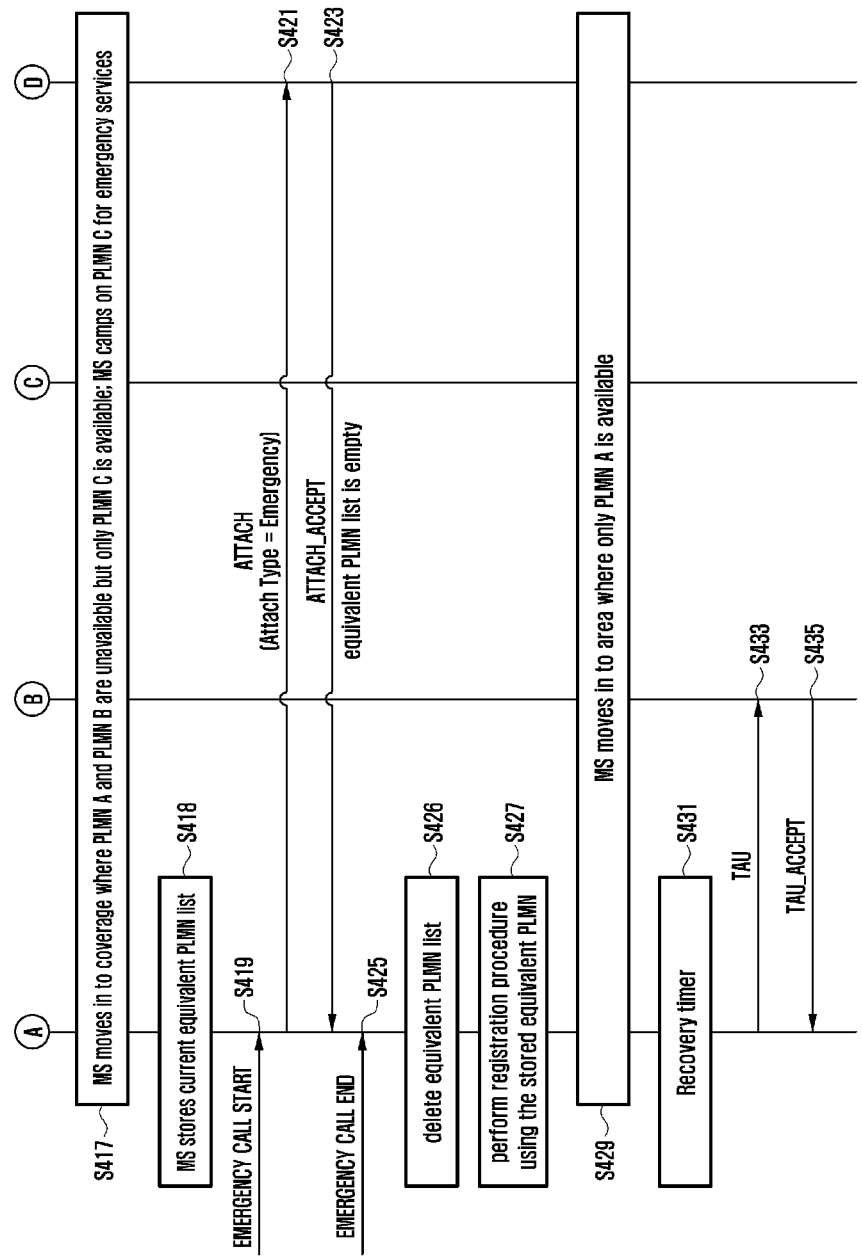

FIGS. 4A and 4B are diagrams that describe a PLMN selection according to a second embodiment of the present disclosure.

Referring to FIGS. 4A and 4B, the mobile communication system may include: MS 410; PLMN A, reference number 430; PLMN B, reference number 450; and PLMN C, reference number 470. PLMN A and PLMN B are equivalent to each other. Since operations S401 to S417 for the embodiment shown in FIGS. 4A and 4B are identical to those of S301 to S317, their detailed description will be omitted in the following description.

The MS 410 may store a current EPLMN list in operation S418. The MS 410 mays store an EPLMN list separately. A PLMN list separately stored is not deleted although the MS 410 performs a process for emergency services. In the embodiment of FIG. 3, when the MS receives an attachment acceptance message from a server for providing emergency services according to types of emergency services, an EPLMN list is deleted. That is, the MS is in a manual mode and attempts for an emergent attachment on a RPLMN or on a different PLMN that is not an EPLMN of the registered EPLMN (when receiving emergency services from PLMN C described in the embodiment of FIG. 4), it may store a current EPLMN list before triggering emergency attachment. In the embodiment of FIG. 4, since the MS stores an EPLMN list separately managed, although it receives an attachment acceptance message from a PLMN for providing emergency services, the EPLMN separately stored in operation S418 is not deleted.

The MS 410 starts with an emergency call in operation S419. The MS 410 may transmit an Attach Request message (ATTACH) for attachment to the PLMN C in operation S421. The type of attachment, Attach Type, is Emergency. The PLMN C may transmit, to the MS 410, an acceptance message, ATTACH_ACCEPT, in response to the attachment request message from the MS 410 in operation S423. The message indicates that an EPLMN list, EPLMN, is empty. The MS 410 ends the emergency call in operation S425.

The MS 410 may delete the EPLMN list in operation S426. When attachment for emergency services is accepted by the MS 410, the EPLMN list is replaced with a new list or deleted. Only a generally managed, EPLMN list is deleted; however, an EPLMN list separately stored in operation S418 is not deleted. That is, the EPLMN list separately stored in operation S418 is not deleted by an attachment acceptance message of a PLMN for providing an emergence call service.

The MS 410 may a registration procedure using the stored EPLMN in operation S427. When an emergency call procedure has been completed and the MS 410 attempts recovery, the RPLMN is replaced with a user's selected PLMN (PLMN B in the embodiment of FIG. 4) and the MS 410 uses the stored EPLMN list.

The MS 410 moves in to an area where only PLMN A is available in operation S429. A recovery timer starts in operation S431. The MS 410 starts with a recovery procedure for receiving network services. It is preferable that the MS 410 attempts registration on PLMN A. In the embodiment of FIG. 3, since the EPLMN (PLMN A) in response to an attachment acceptance request from PLMN C has been deleted, the MS cannot attempt registration on PLMN A. In the embodiment of FIG. 4, since the EPLMN is separately stored in operation S418, the MS can user the stored EPLMN.

The MS 410 may transmit a TAU Request message (TAU) to the PLMN A, based on the stored PLMN A in operation S433. The PLMN A may transmit an acceptance message, TAU_ACCEPT, to the MS 410 in operation S435.

Figure 5:
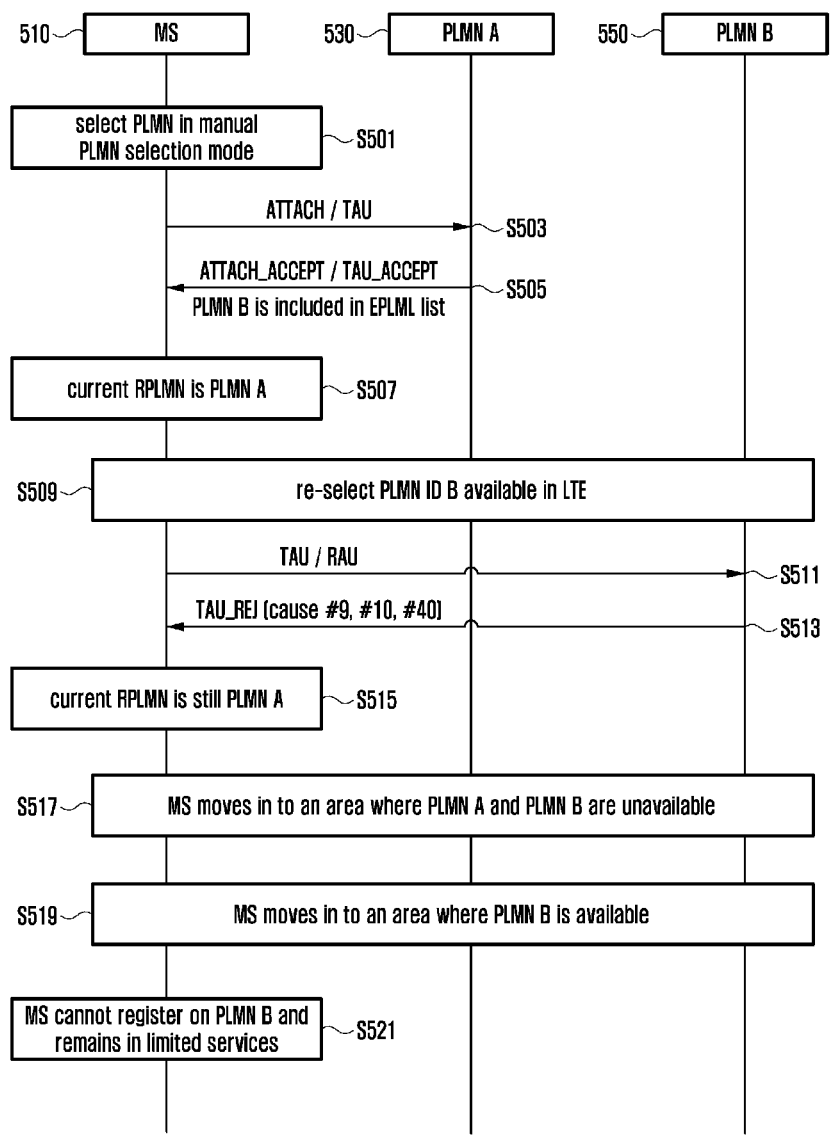
FIG. 5 is a diagram that describes a process when an equivalent PLMN list is deleted according to an embodiment of the present disclosure.

FIG. 5 is a diagram that describes a process when an EPLMN list is deleted according to an embodiment of the present disclosure.

Referring to FIG. 5, the mobile communication system may include: MS 510; PLMN A, reference number 530; and PLMN B, reference number 550. When the MS 510 is in a manual PLMN selection mode, it may select a PLMN according to a user's request in operation S501. In the embodiment of FIG. 5, it is assumed that the MS 510 has selected PLMN A according to a user's command.

The MS 510 may transmit an Attach Request message (ATTACH) or Tracking Area Update Request message (TAU) to the PLMN A according to the current state of the MS 510 in operation S503. The PLMN A may transmit, to the MS 510, an acceptance message, ATTACH_ACCEPT or TAU_ACCEPT, in response to the request message from the MS 510 in operation S505. The ATTACH_ACCEPT or TAU_ACCEPT message may include an EPLMN list, EPLMN LIST. In the embodiment of FIG. 5, the PLMN A may inform the MS 510 that an EPLMN of the PLMN A is PLMN B, through the ATTACH_ACCEPT or TAU_ACCEPT message. A current rRPLMN of the MS 510 is PLMN A in operation S507.

The MS 510 may re-select PLMN ID B as PLMN ID available in Long Term Evolution (LTE) in operation S509. The MS 510 may transmit a TAU Request message (TAU) or RAU request message (RAU) to the PLMN B according to the state of the MS 510 in operation S511. The PLMN B may transmit a TAU Rejection message, TAU_REJ, to the MS 510 in operation S513. While performing TAU in LTE, the EPLMN list may be deleted due to part of the rejection causes, e.g., causes #9, #10, and #40, as follows, excerpted from Specification.

9: The UE shall set the EPS update status to EU2 NOT UPDATED (and shall store it according to sub clause 5.1.3.3) and shall delete any GUTI, last visited registered TAI, TAI list and eKSI. The UE shall delete the list of EPLMNs and shall enter the state EMM-DEREGISTERED.

10: The UE shall delete the list of EPLMNs and shall enter the state EMM-DEREGIS TERED.NORMAL-SERVICE.

40: The UE shall delete the list of EPLMNs and deactivate all the EPS bearer contexts locally, if any, and shall enter the state EMM-DEREGISTERED.NORMAL-SERVICE.

The current RPLMN of the MS 510 is still PLMN A in operation S515. The EPLMN B is deleted due to part of the rejection causes, e.g., causes #9, #10, and #40. The MS 510 may move in to an area where PLMN A and PLMN B are unavailable in operation S517. Since the MS 510 cannot register on a RPLMN and the EPLMN (which is because it is out of the service coverage), it uses only emergency services.

The MS 510 my move in to an area where only PLMN B is available in operation S519. When the operation mode of the MS 510 is changed from Universal Mobile Telecommunications System (UMTS) supported mode (UMTS only/High-Speed Downlink Packet Access (HSDPA) Enhanced Data for Global System for Mobile Communications (GSM) Evolution (HEDGE) only) to UMTS not supported mode (LTE Only/LTE GSM mode), the EPLMN list is deleted in operation S515. Therefore, the MS 510 remains in limited service as it cannot try recovery on available LTE PLMN B in operation S521. This is a common scenario of network deployment seen in EU countries.

FIG. 6 is a diagram that describes a PLMN selection according to a third embodiment of the present disclosure.

Referring to FIG. 6, the mobile communication system may include: MS 610; PLMN A, reference number 630; and PLMN B, reference number 650. When the MS 610 is in a manual PLMN selection mode, it may select a PLMN according to a user's request in operation S601. In the embodiment of FIG. 6, it is assumed that the MS 610 has selected PLMN A according to a user's command.

The MS 610 may store a user's selected PLMN in operation S602. The MS 610 may separately store a user's selected PLMN. The stored, user's selected PLMN may be used to delete an EPLMN according to loss of coverage area.

The MS 610 may transmit an Attach Request message (ATTACH) or TAU Request message (TAU) to the PLMN A according to the current state of the MS 610 in operation S603. The PLMN A may transmit, to the MS 610, an acceptance message, ATTACH_ACCEPT or TAU_ACCEPT, in response to the request message from the MS 610 in operation S605. The ATTACH_ACCEPT or TAU_ACCEPT message may include an EPLMN list, EPLMN LIST. In the embodiment of FIG. 6, the PLMN A may inform the MS 610 that an EPLMN of the PLMN A is PLMN B, through the ATTACH_ACCEPT or TAU_ACCEPT message. A current RPLMN of the MS 610 is PLMN A in operation S607.

The MS 610 may re-select PLMN ID B as PLMN ID available in LTE in operation S609. The MS 610 may transmit a TAU Request message (TAU) or RAU request message (RAU) to the PLMN B according to the state of the MS 610 in operation S611. The PLMN B may transmit a TAU Rejection message, TAU_REJ, to the MS 610 in operation S613. While performing TAU in LTE, the EPLMN list may be deleted due to part of the rejection causes, e.g., causes #9, #10, and #40, which was described above referring to FIG. 5.

The current RPLMN of the MS 610 is still PLMN A in operation S615. The EPLMN B is deleted due to part of the rejection causes, e.g., causes #9, #10, and #40. The MS 610 may store an EPLMN for the current RPLMN in operation S616. The MS 610 may store the PLMN separately. The MS 610 may move in to an area where PLMN A and PLMN B are unavailable in operation S617. Since the MS 610 cannot register on a RPLMN and the EPLMN (which is because it is out of the service coverage), it uses only emergency services.

The MS 610 my move in to an area where only PLMN B is available in operation S619. When the operation mode of the MS 610 is changed from UMTS supported mode (UMTS only/HEDGE only) to UMTS not supported mode (LTE Only/LTE GSM mode), the EPLMN list is deleted. In the embodiment of FIG. 5, the MS 510 remains in limited service as it cannot try recovery on available LTE PLMN B on operation S521.

In the embodiment of FIG. 6, the MS 610 may register on PLMN B and receive the services. The MS 610 may use the user's selected PLMN stored in operation S602 or the EPLMN stored in operation S616 in operation S621. Since the MS 610 stores the EPLMN (PLMN B) separately in operation S616, it can perform registration procedure based on the separately stored PLMN B, and receive the services.

Figure 7A:
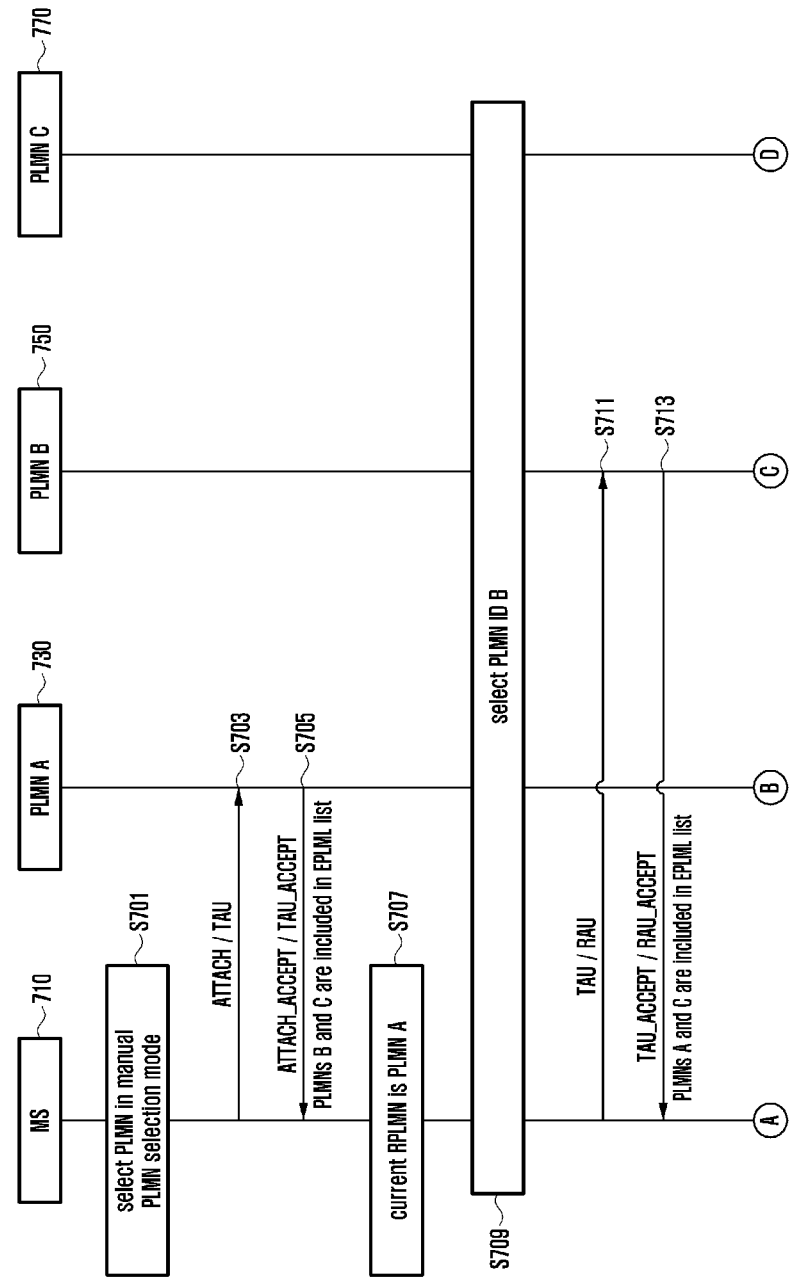
FIGS. 7A and 7B are diagrams that describe a process of an MS when there is a plurality of equivalent PLMNs according to various embodiments of the present disclosure.
Figure 7B:
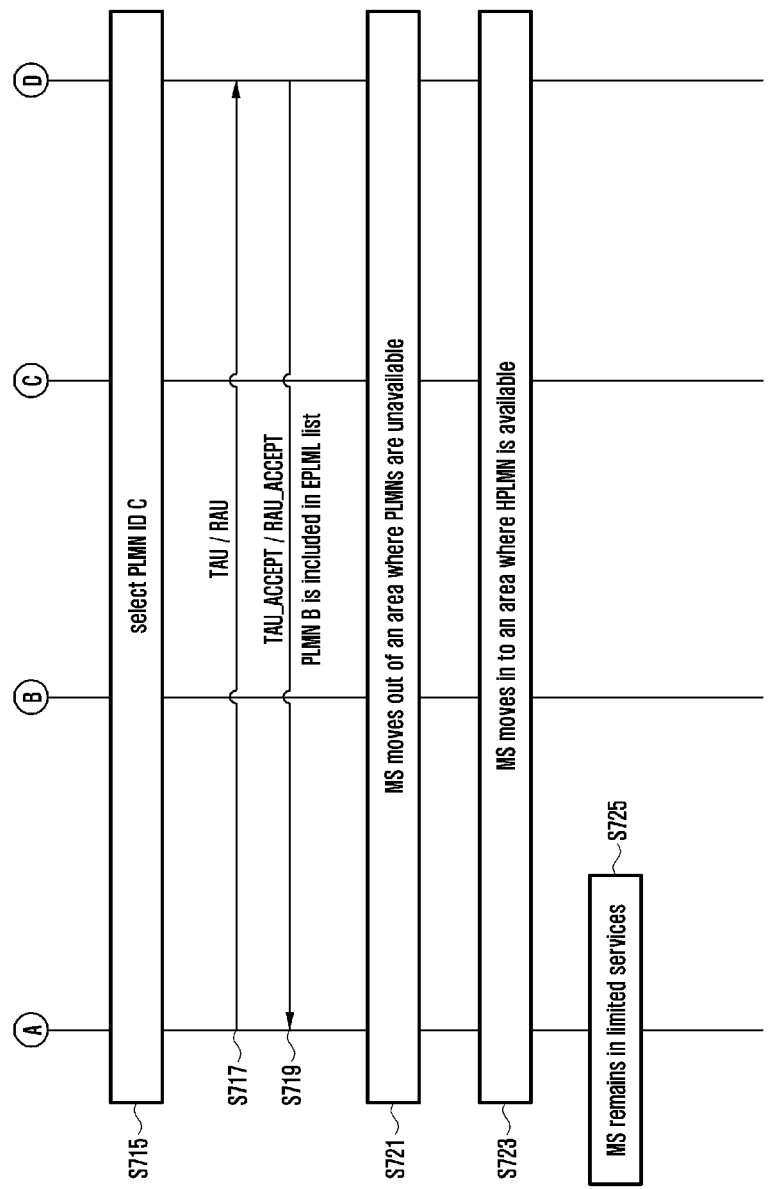

FIGS. 7A and 7B are diagrams that describe a process of an MS when there is a plurality of EPLMNs according to an embodiment of the present disclosure.

Referring to FIG. 7A, the mobile communication system may include: MS 710; PLMN A, reference number 730; PLMN B, reference number 750; and PLMN C, reference number 770. When the MS 710 is in a manual PLMN selection mode, it may select a PLMN according to a user's request in operation S701. In the embodiment of FIG. 7, it is assumed that the MS 710 has selected PLMN A according to a user's command. It is also assumed that: PLMN A is Home PLMN (HPLMN); PLMN B and PLMN C are an equivalent base station of PLMN A; an equivalent base station of PLMN B is PLMN A and PLMN C; and an equivalent base station of PLMN C is PLMN B.

The MS 710 may transmit an Attach Request message (ATTACH) or TAU Request message (TAU) to the PLMN A according to the current state of the MS 710 in operation S703. The PLMN A may transmit, to the MS 710, an acceptance message, ATTACH_ACCEPT or TAU_ACCEPT, in response to the request message from the MS 710 in operation S705. The ATTACH_ACCEPT or TAU_ACCEPT message may include an EPLMN list, EPLMN LIST. In the embodiment of FIG. 7, the PLMN A may inform the MS 710 that an EPLMN of the PLMN A is PLMN B and PLMN C, through the ATTACH_ACCEPT or TAU_ACCEPT message. A current RPLMN of the MS 710 is PLMN A in operation S707.

The MS 710 may select PLMN ID B in operation S709. When the MS remains roaming, it may be attached to a different PLMN. The MS 710 may transmit a TAU Request message (TAU) or RAU request message (RAU) to the PLMN B according to the state of the MS 710 in operation S711. The PLMN B may transmit an acceptance message, TAU_ACCEPT or RAU_ACCEPT, to the MS 710 in operation S713. The acceptance message may indicate that an EPLMN of the PLMN B is PLMN A and PLMN C. Therefore, a RPLMN is PLMN B and the EPLMN is PLMN A and PLMN C.

Referring to FIG. 7B, the MS 710 may select PLMN ID C in operation S715. The MS 710 may transmit a TAU Request message (TAU) or RAU request message (RAU) to the PLMN C according to the state of the MS 710 in operation S717. The PLMN C may transmit an acceptance message, TAU_ACCEPT or RAU_ACCEPT, to the MS 710 in operation S719. The acceptance message may indicate that an EPLMN of the PLMN C is PLMN B. Therefore, a RPLMN is PLMN C and the EPLMN is PLMN B. Since PLMN A is not an EPLMN of PLMN C, it is deleted from the EPLMN list. There may be various causes of PLMN A being deleted from an EPLMN list, e.g., agreement changes or temporary reject cause (#9, #10, and #40) after LAU/TAU procedure triggered due to LAC/TAC change (changed LAC/TAC code not present in LAI/TAI list), followed by loss of coverage.

The MS 710 moves out of an area where PLMNs A, B and C are available in operation S721. In that case, since the MS 710 cannot normally register on PLMN, it uses only emergency services.

The MS 710 moves in to an area where Home PLMN (HPLM) is available in operation S723. In the embodiment of FIG. 7B, it is assumed that HPLMN is PLMN A. Although the MS registers on PLMN to receive normal services, since PLMN C has been registered as a RPLMN before using emergency services, the MS cannot register on PLMN A using the RPLMN. Another reason is because PLMN B has been in the EPLMN list. Therefore, the MS can use only emergency services in operation S725. That is, when the MS returns back to Home network, it cannot recover on PLMN A in manual mode. To resolve this problem, the MS needs a method of returning back to HPLMN and receiving normal services.

Figure 8A:
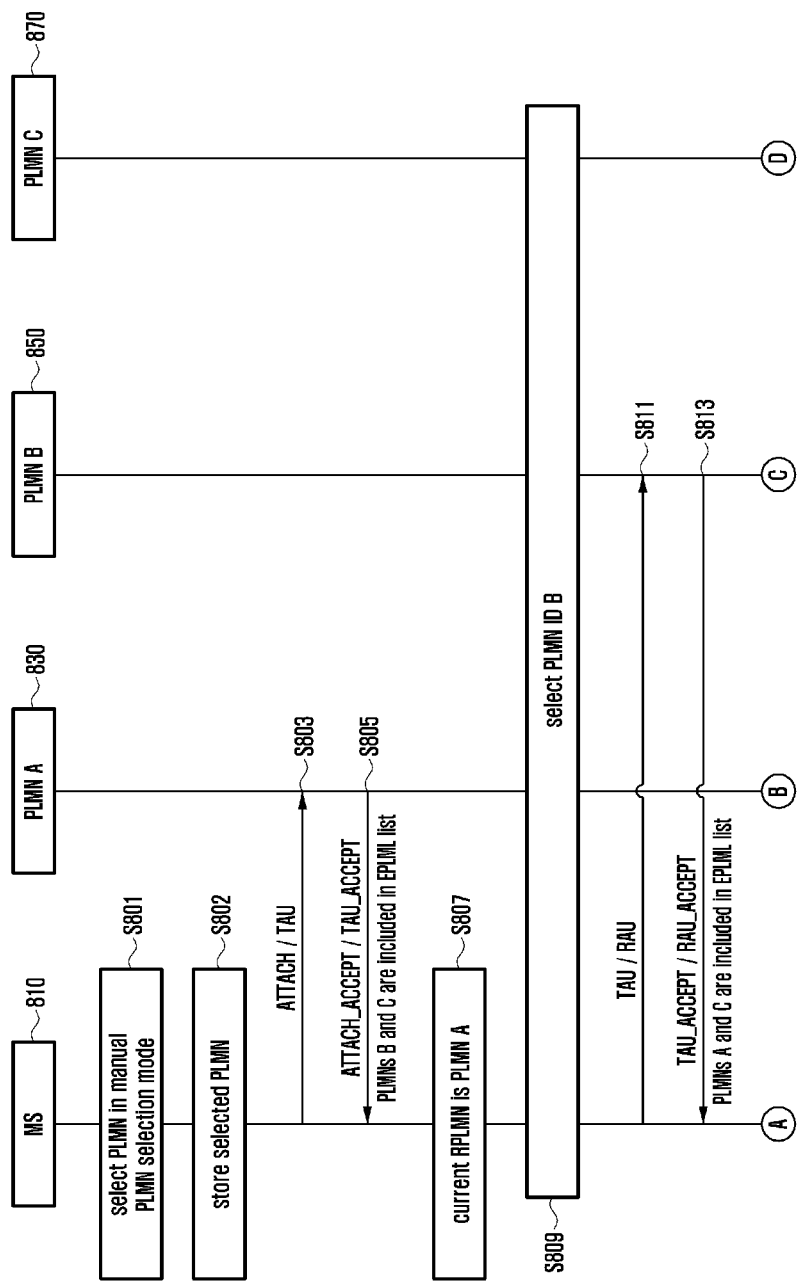
FIGS. 8A and 8B are diagrams that describe a PLMN selection according to a fourth embodiment of the present disclosure.
Figure 8B:
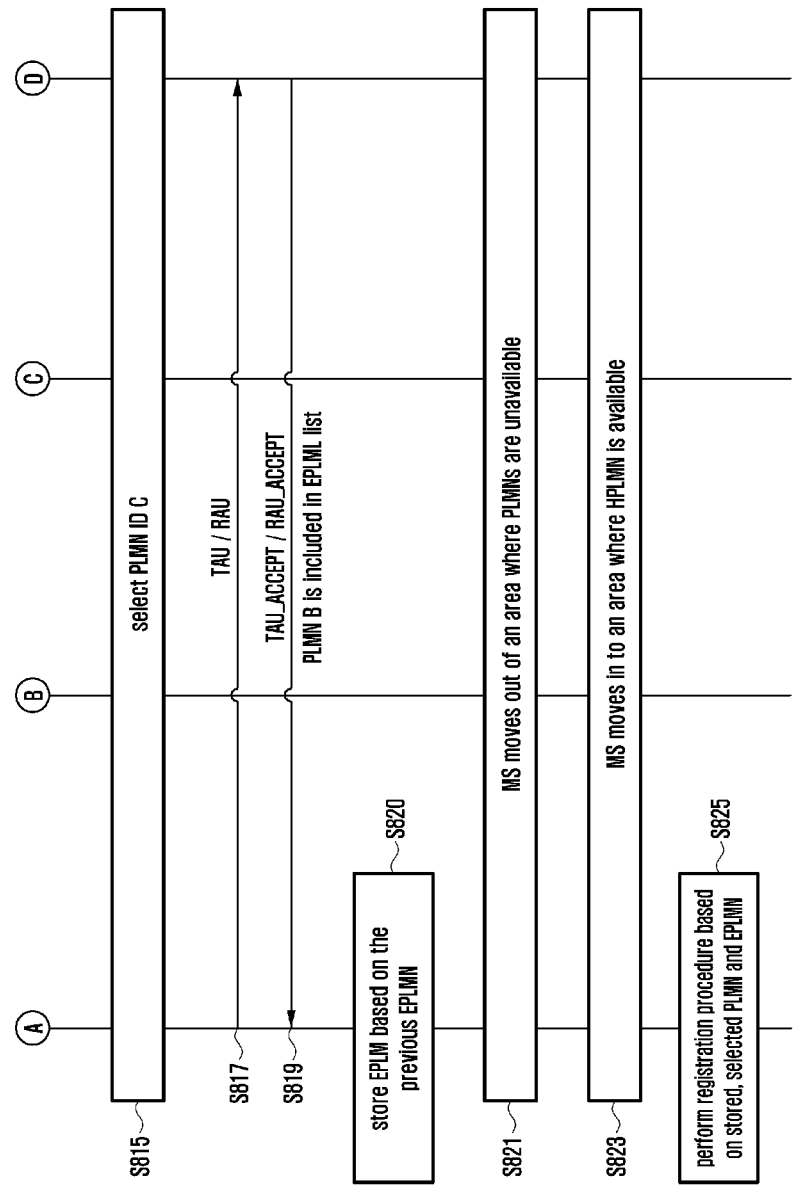

FIGS. 8A and 8B are diagrams that describe a PLMN selection according to a fourth embodiment of the present disclosure.

Referring to FIG. 8A, the mobile communication system may include: MS 810; PLMN A, reference number 830; PLMN B, reference number 850; and PLMN C, reference number 870. When the MS 810 is in a manual PLMN selection mode, it may select a PLMN according to a user's request in operation S801. In the embodiment of FIG. 8, it is assumed that the MS 810 has selected PLMN A according to a user's command. It is also assumed that: PLMN A is Home PLMN (HPLMN); PLMN B and PLMN C are an equivalent base station of PLMN A; an equivalent base station of PLMN B is PLMN A and PLMN C; and an equivalent base station of PLMN C is PLMN B. The MS 810 may store the selected PLMN in operation S802.

The MS 810 may transmit an Attach Request message (ATTACH) or TAU Request message (TAU) to the PLMN A according to the current state of the MS 810 in operation S803. The PLMN A may transmit, to the MS 810, an acceptance message, ATTACH_ACCEPT or TAU_ACCEPT, in response to the request message from the MS 810 in operation S805. The ATTACH_ACCEPT or TAU_ACCEPT message may include an EPLMN list, EPLMN LIST. In the embodiment of FIG. 8, the PLMN A may inform the MS 810 that an EPLMN of the PLMN A is PLMN B and PLMN C, through the ATTACH_ACCEPT or TAU_ACCEPT message. A current RPLMN of the MS 810 is PLMN A in operation S807.

The MS 810 may select PLMN ID B in operation S809. When the MS remains roaming, it may be attached to a different PLMN. The MS 810 may transmit a TAU Request message (TAU) or RAU request message (RAU) to the PLMN B according to the state of the MS 810 in operation S811. The PLMN B may transmit an acceptance message, TAU_ACCEPT or RAU_ACCEPT, to the MS 810 in operation S813. The acceptance message may indicate that an EPLMN of the PLMN B is PLMN A and PLMN C. Therefore, a RPLMN is PLMN B and the EPLMN is PLMN A and PLMN C.

Referring to FIG. 8B, the MS 810 may select PLMN ID C in operation S815. The MS 810 may transmit a TAU Request message (TAU) or RAU request message (RAU) to the PLMN C according to the state of the MS 810 in operation S817. The PLMN C may transmit an acceptance message, TAU_ACCEPT or RAU_ACCEPT, to the MS 810 in operation S819. The acceptance message may indicate that an EPLMN of the PLMN C is PLMN B. Therefore, a RPLMN is PLMN C and the EPLMN is PLMN B. In the embodiment of FIG. 7, since PLMN A is not an EPLMN of PLMN C, it is deleted from the EPLMN list. However, in the embodiment of FIG. 8, the EPLMN (EPLMN) is stored, considering the previous EPLMN, in operation S820. That is, when PLMN B is a RPLMN and the RPLMN is changed from PLMN B to PLMN C, EPLM is stored in an EPLMN list of the PLMN C including PLMN A when PLMN B is a RPLMN, considering that EPLMN is PLMNs A and C. There may be various methods of storing EPLMN considering the previous EPLMN, e.g., updating the existing EPLM by adding PLMN A to the previous EPLMN or storing PLMN as a separate EPLMN.

The MS 810 moves out of an area where PLMNs A, B and C are available in operation S821. In that case, since the MS 810 cannot normally register on PLMN, it uses only emergency services.

The MS 810 moves in to an area where Home PLMN (HPLM) is available in operation S823. In the embodiment of FIG. 8, it is assumed that HPLMN is PLMN A. In the embodiment of FIGS. 7A and 7B, since PLMN A is not a RPLMN and not included in an EPLMN list, the MS cannot normally register on PLMN A. Therefore, the MS uses only emergency services.

The MS 810 may perform a registration procedure based on EPLM stored considering the previous EPLMN and a stored, selected PLMN in operation S825. The MS 810 may perform a registration procedure based on EPLM registered considering the previous EPLMN, selected PLMN, and RPLMN. In the embodiment of FIGS. 8A and 8B, a RPLMN is PLMN C and a user's selected PLMN is PLMN A. An EPLMN configured considering the previous EPLMN includes PLMN A. Therefore, the MS can normally register on PLMN A, and use normal services.

Figure 9:
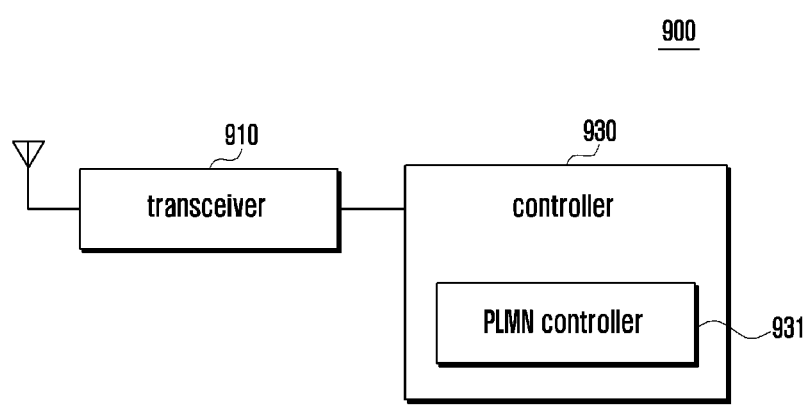
FIG. 9 is a schematic block diagram of an MS according to an embodiment of the present disclosure.

FIG. 9 is a schematic block diagram of an MS according to an embodiment of the present disclosure.

Referring to FIG. 9, the MS 900 may include a transceiver 910 for communicating with at least one network node, and a controller 930 for controlling the entire operation of the MS 900. The controller 930 may include a PLMN controller 931. The PLMN controller 931 controls selection of PLMN, storage of PLMN list, etc.

According to various embodiments of the present disclosure, the PLMN controller 931 may: select a PLMN as a network that the MS will be attached to in a manual PLMN selection mode; store the selected PLMN in a user selection PLMN list; and select, when the MS attempts recovery for receiving normal services in a limited service state, a PLMN from the selection PLMN list to be attached to a network. The limited service state refers to a state where the MS moves out of an area where PLMNs are available and does not thus receive normal services from the RPLMNs.

According to various embodiments of the present disclosure, the PLMN controller 931 may: additionally store an EPLMN list of a user's selected, EPLMNs; and attach to a network based on the additionally stored, EPLMN list. According to various embodiments of the present disclosure, the PLMN controller 931 may: control the MS to remain in a limited service state when the MS moves in to a service area where an EPLMN for a user's selected PLMN is available and the operation mode of the MS is changed from the EPLMN to the RPLMN; and control, when the MS attempts attachment to a network in a service area where the user selection PLMN is available, the MS to attach to the network based on the stored, selected PLMN list of PLMNs.

According to various embodiments of the present disclosure, the PLMN controller 931 determines whether the MS attempts an emergency attachment to a PLMN except for a RPLMN and an EPLMN; and controls, when the MS attempts an emergency attachment to a PLMN, the MS to additionally store a current RPLMN list. The PLMN controller 931 control the MS to attempt attachment to a network corresponding to a PLMN on the EPLMN list after the emergency attachment is made and to attach to the network based on the additionally stored, EPLMN list. In addition, the additionally stored, EPLMN list is not deleted by an access acceptance message ACCESS ACCEPT transmitted from a base station when the MS attempts the emergency attachment.

According to various embodiments of the present disclosure, the PLMN controller 931 may control the MS: to select an EPLMN for a user selecting PLMN as a network that the MS will be attached to; to receive an attachment rejection message from a base station of the EPLMN; to store an EPLMN list for the current RPLMN; and, when attempting re-attachment to the EPLMN, to be attached to a network based on a stored, EPLMN list. In addition, the EPLMN list is not deleted by an access rejection message transmitted from a base station of the EPLMN.

The embodiment is implemented in such a way that the MS 900 includes separated blocks, but not limited thereto. For example, the embodiment may be modified in such a way that the controller 930 performs the operations of the PLMN controller 931. In addition, the controller 930 may control the operations of the MS described above referring to FIGS. 1 to 8.

Although the base station and the upper nodes of the respective PLMNs with which the MS communicates are not illustrated in FIGS. 1 to 8, it should be understood that the base station and the upper nodes include transceivers for communicating with other network nodes and also controllers for performing the operations described in the various embodiments.

As described above, the apparatus and method according to various embodiments of the present disclosure can efficiently select a PLMN in a mobile communication system. The apparatus and method can also select a PLMN in a manual PLMN selection mode.

The apparatus and method can provide a PLMN selection in a case where a PLMN cannot normally register since a RPLMN or the EPLMN has been deleted.

The apparatus and method can resolve a problem that the MS does not normally register on networks and uses only emergency services, and can allow the MS to use general services in a manual PLMN selection mode.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of selecting public land mobile networks (PLMNs) by a terminal in a mobile communication system, the method comprising:

selecting a PLMN as a network that the terminal will be attached to in a manual PLMN selection mode;

connecting to the selected PLMN, and storing the selected PLMN in a user selection PLMN list;

detecting that the terminal is in a limited service state; and selecting, when the terminal attempts recovery to receive normal services in the limited service state, a PLMN to be attached to a network based on at least one PLMN included in the stored user selection PLMN list.

2. The method of claim 1, wherein the limited service state includes a state where the terminal moves out of a service area where PLMNs have agreements with the terminal and does not receive normal services from the PLMNs.

3. The method of claim 1, further comprising:
additionally storing an equivalent PLMN list for a user selection equivalent PLMN; and
attaching to a network based on the additionally stored, equivalent PLMN list.

4. The method of claim 1, further comprising:
moving into a service area where an equivalent PLMN for the user selection PLMN is available;
operating in the limited service state while the operation mode of the terminal is changed from the equivalent PLMN to a registered PLMN; and
attaching, when attachment is made to a network in a service area where the user selection PLMN is available, to the network based on the stored, selected PLMN list of PLMNs.

5. The method of claim 1, further comprising:
determining whether an emergency attachment is made to a PLMN except for a registered PLMN and an equivalent PLMN; and
additionally storing a current registered PLMN list when an emergency attachment is made.

6. The method of claim 5, further comprising:
attempting an attachment to a network corresponding to a PLMN on the equivalent PLMN list after the emergency attachment is made; and
attaching to the network based on the additionally stored, equivalent PLMN list.

7. The method of claim 5, wherein the additionally stored, equivalent PLMN list is not deleted by an access acceptance message ACCESS ACCEPT transmitted from a base station when the emergency attachment is made.

8. The method of claim 5, further comprising starting a timer before attaching to the network.

9. The method of claim 1, further comprising:
selecting an equivalent PLMN for a user selection PLMN as a network that the terminal will be attached to;
receiving an attachment rejection message from a base station of the equivalent PLMN;
storing an equivalent PLMN list for the current registered PLMN; and
attaching, when re-attachment is made to the equivalent PLMN, to a network based on a stored, equivalent PLMN list.

10. The method of claim 9, wherein the equivalent PLMN list is not deleted by an access rejection message transmitted from a base station of the equivalent PLMN.

11. A terminal of selecting public land mobile networks (PLMNs) in a mobile communication system, the terminal comprising:
a transceiver configured to communicate with at least one network node; and
a PLMN controller configured to:
select a PLMN as a network that the terminal will be attached to in a manual PLMN selection mode;
connect to the selected PLMN, and store the selected PLMN in a user selection PLMN list,
detect that the terminal is in a limited service state, and
select, when attempting recovery to receive normal services in the limited service state, a PLMN to be attached to a network based on at least one PLMN included in the stored user selection PLMN list.

12. The terminal of claim 11, wherein the limited service state includes, a state where the terminal moves out of a service area where PLMNs have agreements with the terminal and does not receive normal services from the PLMNs.

13. The terminal of claim 11, wherein the PLMN controller is further configured to:
additionally store an equivalent PLMN list for a user selection equivalent PLMN; and
attach to a network based on the additionally stored, equivalent PLMN list.

14. The terminal of claim 11, wherein the PLMN controller is further configured to control the terminal to:
operate, when moving in to a service area where an equivalent PLMN for the user selection PLMN is available, in the limited service state while the operation mode of the terminal is changed from the equivalent PLMN to a registered PLMN; and
attach, when attachment is made to a network in a service area where the user selection PLMN is available, to the network based on the stored, selected PLMN list of PLMNs.

15. The terminal of claim 11, wherein the PLMN controller is further configured to:
determine whether an emergency attachment is made to a PLMN except for a registered PLMN and an equivalent PLMN; and
additionally store a current registered PLMN list when an emergency attachment is made.

16. The terminal of claim 15, wherein the PLMN controller is further configured to:
attempt an attachment to a network corresponding to a PLMN on the equivalent PLMN list after the emergency attachment is made; and
attach to the network based on the additionally stored, equivalent PLMN list.

17. The terminal of claim 15, wherein the additionally stored, equivalent PLMN list is not deleted by an access acceptance message ACCESS ACCEPT transmitted from a base station when the emergency attachment is made.

18. The terminal of claim 15, wherein the PLMN controller is further configured to start a timer before the emergency attachment is made.

19. The terminal of claim 11, wherein the PLMN controller is further configured to:
select an equivalent PLMN for a user selection PLMN as a network that the terminal will be attached to;
receive an attachment rejection message from a base station of the equivalent PLMN;
store an equivalent PLMN list for the current registered PLMN; and
attach, when re-attachment is made to the equivalent PLMN, to a network based on a stored, equivalent PLMN list.

20. The terminal of claim 19, wherein the equivalent PLMN list is not deleted by an access rejection message transmitted from a base station of the equivalent PLMN.

* * * * *